(12) United States Patent
de Wit et al.

(10) Patent No.: US 9,176,562 B2
(45) Date of Patent: Nov. 3, 2015

(54) SYSTEM AND METHOD FOR SELECTING AND EXECUTING A TASK BASED UPON A MEASURED AMOUNT OF ENERGY

(75) Inventors: Frank de Wit, Nieuwegein (NL); Florin Tatar, Delft (NL)

(73) Assignee: AKTIEBOLAGET SKF, Gothenburg (SE)

( * ) Notice: Subject to any disclaimer, the term of this patent is extended or adjusted under 35 U.S.C. 154(b) by 623 days.

(21) Appl. No.: 13/501,767

(22) PCT Filed: Nov. 18, 2009

(86) PCT No.: PCT/EP2009/008223
§ 371 (c)(1),
(2), (4) Date: Jun. 29, 2012

(87) PCT Pub. No.: WO2011/060799
PCT Pub. Date: May 26, 2011

(65) Prior Publication Data
US 2012/0271478 A1    Oct. 25, 2012

(51) Int. Cl.
*G06F 1/26*    (2006.01)
*G06F 1/32*    (2006.01)

(52) U.S. Cl.
CPC .................................. *G06F 1/3203* (2013.01)

(58) Field of Classification Search
CPC .................................................. G06F 1/3212
See application file for complete search history.

(56) References Cited

U.S. PATENT DOCUMENTS

| | | | |
|---|---|---|---|
| 4,902,956 A * | 2/1990 | Sloan | 320/135 |
| 6,697,953 B1 | 2/2004 | Collins | |
| 2008/0047363 A1 | 2/2008 | Arms et al. | |
| 2008/0162968 A1 | 7/2008 | Breen et al. | |
| 2008/0189567 A1 | 8/2008 | Goodnow et al. | |

FOREIGN PATENT DOCUMENTS

WO    WO2007089499 A2    8/2007

OTHER PUBLICATIONS

Vijay Raghunathan, Curt Schurgers, Sung Park, and Mani B. Srivastava. Energy-Aware Wireless Microsensor Networks. IEEE Signal Processing Magazine, vol. 19, Iss 2, Mar. 2002, pp. 40-50 [online], [retrieved on Oct. 21, 2014]. Retrieved from the Internet <URL: http://ieeexplore.ieee.org/xpl/articleDetails.jsp?arnumber=985679><DOI: 10.1109/79.985679>.*

Chris Knight, Joshua Davidson, and Sam Behrens. Energy Options for Wireless Sensor Nodes. Sensors, Dec. 2008, pp. 8037-8066 [online], [retrieved on Nov. 6, 2014]. Retrieved from the Internet <URL: http://www.mdpi.com/1424-8220/8/12/8037><DOI: 10.3390/s8128037>.*

* cited by examiner

*Primary Examiner* — Kenneth M Lo
*Assistant Examiner* — Geoffrey Wellman
(74) *Attorney, Agent, or Firm* — Bryan Peckjian; SKF USA Inc. Patent Dept.

(57) ABSTRACT

A system and method for executing a plurality of pre-determined signal processing tasks includes an energy source for powering a signal processing system. The energy source supplies an amount of energy that varies over the service life of the energy source. The signal processing system determines an amount of energy available from the energy source and selects for execution a specific one of the pre-determined signal processing tasks in dependence on the amount determined.

13 Claims, 4 Drawing Sheets

SYSTEM AND METHOD FOR SELECTING AND EXECUTING A TASK BASED UPON A MEASURED AMOUNT OF ENERGY

CROSS-REFERENCE

This application is the US national stage of International Application No. PCT/EP2009/008223 filed on Nov. 18, 2009.

FIELD OF THE INVENTION

The invention relates to an apparatus comprising electronic circuitry with a signal processing system for executing a plurality of pre-determined signal processing tasks, and an energy source for powering the electronic circuitry in operational use of the apparatus. The energy source is operative to make available an amount of energy that varies over a service life of the energy source. The invention further relates to electronic circuitry for use in such apparatus, and to a method of executing a pre-determined signal processing task.

BACKGROUND ART

As an example of an energy source that makes available energy in amounts that vary over the service life of the energy source, consider an energy scavenger combined with an energy storage that stores the scavenged energy. The expressions "energy scavenging" and "energy harvesting" refer to technologies, known in the art, for converting ambient, stray energy from external sources into electricity. For example, a piezoelectric crystal can be used to convert mechanical energy from vibrations into electric energy. As another example, a temperature difference between two different electrical conductors can be used to generate a voltage across, or current through, the junction of the conductors. As still another example, consider a magnet that is made to move past a coil as a result of the vibratory or cyclic motion of a mass to which the magnet is attached. The moving magnet generates a change of magnetic flux in the coil, and induces an electromotive force on the coil. Accordingly, a plurality of technologies is available for extracting energy from the environment. A component, which extracts stray energy from its environment and makes the extracted energy available for consumption, is referred to as an energy scavenger.

For completeness, the terms "vary" and "varying" as used herein in order to qualify the energy source discussed above, cover the scenarios wherein the amount of energy made available varies over a range, and also cover the scenario of a complete lack of energy.

The extracted energy may be stored in an energy storage device, such as a (rechargeable) battery, a capacitor or a supercapacitor. A supercapacitor is also known as an electric double-layer capacitor. A supercapacitor is an electrochemical capacitor that has a much higher energy density than a conventional capacitor, owing to the use of a layer of nanoporous material that dramatically increases the layer's surface area, allowing many more charge carriers to be stored in any given volume.

A typical application of using an energy scavenger is the powering of small autonomous electronic devices, e.g., sensors, or actuators. These devices are small and require little power. Their applications are limited by the reliance on electric power. Scavenging energy from ambient vibrations, wind, heat or light, enables to replenish the energy consumed by the electronic device and enables the device to continue functioning over a time span that is long enough compared to the intended application. Such devices can be exploited in, e.g., condition monitoring applications.

US patent application publication 2008/0047363 discloses a device that can be attached to a structure or live subject and that can harvest energy from its environment to power sensing, storing and transmitting data about the structure or live subject. The known device comprises an energy harvester and an energy storage device for storing the energy harvested. The known devices also comprises sensors, conditioners for conditioning the sensor signals, a processor for processing data representative of the conditioned sensor signals, data storage and a data transmitter. The known device comprises a microcontroller that controls the power consumed by the sensors, signal conditioning, processing, and transmission components of the energy harvesting wireless sensing device. The power consumed by all of the known device's components (sensor, conditioner, processor, data storage, and data transmission) must be compatible with the amount of energy harvested. Minimizing the power required to collect and transmit data correspondingly reduces the demand on the power source. Reduced power consumption is inherently beneficial to the performance of systems using harvested energy. A reduction in power consumption can be realized through the use of embedded software in the microcontroller that controls the power consumed by the sensors, signal conditioning, processing, and transmission components of the energy harvesting wireless sensing device. By adjusting the time these components are on, for example, power consumed can be reduced. In addition the microcontroller can be programmed to process and store sensed information, rather than immediately transmit the sensed information, so as to reduce the frequency of data transmission events. The microcontroller is programmed to go into sleep mode and turn power to other components off. The microcontroller drains a small amount of energy in the sleep mode to keep a timer running. When it is time to wake up, the microcontroller assesses the level of the energy available at the energy storage device. If the level is too low, the microcontroller goes back into sleep mode. If the level is okay, the microcontroller restores power to the other components, performs a predetermined task and goes back to sleep again.

SUMMARY OF THE INVENTION

An embodiment of the invention relates to an apparatus comprising electronic circuitry with a signal processing system for executing a plurality of pre-determined signal processing tasks. The apparatus also comprises an energy source configured for powering the electronic circuitry in operational use of the apparatus. The energy source is operative to supply an amount of energy that varies over a service life of the energy source. The electronic circuitry is configured for determining the amount of energy available from the energy source; and selecting for execution a specific one of the plurality of pre-determined signal processing tasks in dependence on the amount determined.

It may not be known in advance whether enough energy will be available from the energy source for powering the electronic circuitry, and for enabling the signal processing system to execute one or more specific ones of the pre-determined signal processing tasks. The signal processing system requires a specific amount of energy for executing and completing a specific one of the pre-determined signal processing tasks. If not enough energy is available from the energy storage device for executing a specific task, the task cannot be executed. The varying energy level of the energy source makes it impossible for the signal processing system to rely on being awake or even alive for the duration of the execution of a task. The energy available from the energy source will vary over time. Above embodiment of the apparatus in the invention makes the best of this uncertainty and only executes a particular pre-determined signal processing task if there is enough energy available from the energy source for executing this particular task.

Note that any of the signal processing tasks to be executed in the apparatus of the invention is not time-critical, in the sense that the task needs to start at a particular moment, determined in advance, or end at a particular other moment, determined in advance. This is inherent in the approach taken in the invention, as the energy available for powering the signal processing system varies over the service life of the energy source. As a result it is not known in advance if, and when, a particular one of the signal processing tasks can be executed. In the apparatus of the invention, first the amount of energy is determined that is available from the energy source. Once the available amount of energy has been determined, it can be determined which one of the signal processing tasks is to be executed given the available amount of energy determined.

Whether a particular one of the pre-determined signal processing tasks is selected for execution depends, therefore, on the amount of energy available to the electronic circuitry. The selection may, however, also be co-determined by other criteria, in addition to the amount of energy available to the electronic circuitry.

For example, the plurality of pre-determined signal processing tasks is organized as an ordered list, e.g., as a linear array with a beginning and an end, or as a circular array (wherein the sequence of tasks repeats itself), so that a specific one of the pre-determined signal processing tasks is a selectable candidate for execution only if another pre-determined signal processing task, preceding the specific pre-determined signal processing task in the list, has been executed. This approach is taken, e.g., if the input to each next task on the list depends on the output of the previous task on the list. To this end, the signal processing system maintains a history log about those specific ones of the pre-determined signal processing tasks, whose execution has successfully been completed or, its logic complement: those specific pre-determined signal processing tasks, which still have to be executed. The particular pre-determined signal processing task to be executed next is selected from among those pre-determined signal processing tasks, still awaiting execution according to the history log, and whose energy requirements match the amount of energy available. Maintaining such a history log, e.g., in a non-volatile memory, is then one of the house-keeping tasks of the signal processing system in the apparatus of the invention. In the linear array or circular array of the signal processing tasks, a flag can be set to indicate the next signal processing task to be executed, instead of maintaining a history log.

As another example, each respective one of the pre-determined signal processing tasks is assigned a respective priority in advance. For example, a first one of the pre-determined signal processing tasks is assigned a first priority, and a second one of the pre-determined signal processing tasks is assigned a second priority that is lower than the first priority. In case the amount of energy, available to the signal processing system, is adequate for execution of the first pre-determined signal processing task or the second pre-determined signal processing task, the electronic circuitry selects the first pre-determined signal processing task as a result of its higher priority. The priorities assigned may be made dynamic in the sense that the priorities may vary among the pre-determined signal processing tasks, e.g., depending on the time of the day, the pre-determined signal processing tasks already executed, the output of a particular pre-determined signal processing task executed, etc. It is then one of the housekeeping tasks of the signal processing system to maintain an overview of the most recently assigned priorities, e.g., in a non-volatile memory.

In a further embodiment of the invention, the energy source comprises an energy scavenger for scavenging ambient energy, and an energy storage device configured for storing the ambient energy scavenged by the energy scavenger. The energy storage comprises, e.g., a capacitor, a supercapacitor or a battery, e.g., a rechargeable battery. A disposable battery, i.e., a formally non-rechargeable battery, can be used under circumstances, as a disposable battery can nevertheless be recharged to some extent. The energy harvested is eventually used to power the signal processing system. Whether or not the energy scavenger is capable of harvesting energy during a certain time interval, and if so, how much, depends on external, inherently unpredictable circumstances. As a result, it is not known in advance whether, at a certain moment, enough energy will be available from the energy storage device for powering the signal processing system, and for thereby enabling the signal processing system to execute one or more specific ones of the pre-determined signal processing tasks. Therefore, first an amount of energy, available from the energy storage device, is determined, and then it is determined if the amount available is adequate for executing one or more specific ones of the pending signal processing tasks.

For completeness, the expression "energy scavenger" as used throughout this text and the claims, is also meant to cover the concept of an energy harvester, for anyone who would like to make this distinction. An energy scavenger takes energy from the side effects of a process in a dynamic system. Consider, for example, deriving energy from the heat that is produced by the unavoidable friction in a running rolling element bearing or a plain bearing). In practice, taking energy from the side effects hardly affects the process itself, if at all. An energy harvester takes energy from the process itself and thereby influences the system. In principle, the energy drained from the process needs to be replaced by the power source driving the process. Consider, for example, the dynamo installed on a bicycle to power the bicycle's headlight and rear lamp. The dynamo is driven by the bicycle's rotating front wheel or rear wheel that in turn is driven by the rider him/herself via the pedals.

In a further embodiment, the energy source comprises a battery, e.g., a disposable battery. The performance of a disposable battery gradually deteriorates over time as a result of chemical and physical changes that take place in the battery's components during use. Although the energy storage properties and discharge properties of the battery can be selected in advance to be appropriate for the battery's intended application, a battery does not always provide the expected amount of current or power before becoming depleted. This makes it difficult to ensure a reliable duration of the battery as an energy source. In this embodiment, the signal processing task to be executed next is determined in dependence on the amount of energy available from the battery.

In a further embodiment, the battery is arranged in parallel with a capacitor or in parallel with a supercapacitor. When a disposable battery discharges, its internal Ohmic resistance increases. As a result, the amount of energy, which can be supplied per unit of time to a load connected to the battery, decreases. The capacitor or supercapacitor provides a lower internal impedance than the battery so as to increase the amount of energy per unit time that is available to the load, i.e., to the electronic circuitry. After the capacitor, or the supercapacitor, has been drained by the electronic circuitry, the battery recharges the capacitor or the supercapacitor. It may take some time for the battery to recharge the capacitor or the supercapacitor, depending on the battery's discharge state. However, once the capacitor or the supercapacitor has been recharged, more power (energy per unit time) is available from the capacitor or from the supercapacitor than would be available directly from the battery, i.e., available from the battery in the absence of the capacitor or of the supercapacitor. Note that the energy source may comprise an energy scavenger and an energy storage device that includes a battery and a capacitor. The battery serves to store the harvested energy, whereas the capacitor is arranged to provide low impedance to the signal processing system.

In an embodiment of the apparatus of the invention, the electronic circuitry comprises an energy control component. The energy control component connects the energy source and the signal processing system, if a first magnitude of the amount of energy, available from the energy source, is higher than a first pre-determined threshold. The energy control component disconnects the energy source and the signal processing system, if a second magnitude of the amount of energy, available from the energy source, is lower than a second pre-determined threshold. The first pre-determined threshold is higher than the second pre-determined threshold by an amount that is representative of a reserve quantity of energy, needed by the signal processing system in order to run its housekeeping tasks in preparation to its being turned off (zero-power).

The energy control component is implemented, e.g., with a voltage-dependent switch with hysteresis such as a Schmitt trigger, voltage range sensor or window discriminator. These entities are known in the art.

Consider the following scenario as an example. Assume that initially there is not enough energy available from the energy source to power the signal processing system. Assume further that the amount of energy available from the energy source starts to increase. Sooner or later, the amount of energy available from the energy source will exceed the first pre-determined threshold. When that happens, the energy control component connects the energy source and the signal processing system. The signal processing system comes to life and the electronic circuitry determines whether the amount of energy available is adequate for executing a signal processing task. So long as the available energy is not sufficient to execute any of the signal processing tasks, the signal processing system remains in a low-power mode, wherein the signal processing system periodically or repeatedly checks the amount of energy available from the energy source. If the amount of energy then decreases again and drops below the second pre-determined threshold, the energy control component disconnects the energy source from the signal processing system. As a result, the signal processing system is switched off. If, instead, the available amount of energy increases, the available amount of energy will sooner or later exceed the amount needed to execute a specific one of the signal processing tasks. When the electronic circuitry has determined that there is a sufficient amount of energy available from the energy source to execute a pending signal processing task, the signal processing system starts execution of the pending signal processing task. The available amount of energy may then drop again, or remain at substantially the same level or increase further. The change in the available amount of energy depends at least partly on the amount of energy consumed by the electronic circuitry. The available amount of energy may remain substantially at the same level or may increase while energy is consumed by the electronic circuitry. For example, the energy source comprises an energy scavenger that continues to scavenge a further amount of energy that substantially equals, or is larger than, the amount of energy consumed by the electronic circuitry for executing the signal processing task. As another example, the energy source comprises a parallel arrangement of a battery and a capacitor. The battery keeps charging the capacitor with a current of a magnitude that is substantially equal to, or larger than, a further current that is supplied, via the capacitor, to power the signal processing system.

As specified above, the electronic circuitry determines whether there is available from the energy source an amount of energy that is sufficient for executing a pending signal processing task. As an option, the magnitude of the sufficient amount of energy takes into account the energy needed by the signal processing tasks to execute its housekeeping tasks. The housekeeping tasks include, e.g., the saving of state information in non-volatile memory, in preparation of the signal processing system being shut down completely when the energy control component turns off.

In a further embodiment of the apparatus according to the invention, the apparatus comprises a data source and a data destination, and the signal processing system comprises a data processing system, e.g., one or more microprocessors and/or one or more microcontrollers. The data processing system is operative to process input data and to supply output data, under instruction control. The data source supplies the input data to the data processing system, and the data destination receives the output data from the data processing system as a result of the processed input data. The data source comprises, e.g., a sensor configured for sensing a physical quantity, indicative of an attribute of an environment of the apparatus. The sensor is operative to generate the input data, representative of the physical quantity sensed. The data destination comprises at least one of: a memory, e.g., a non-volatile memory, for accumulating the output data; a transmitter for transmitting, e.g., wirelessly, the output data to a receiver external to the apparatus; and an actuator for controlling at least one of: a position, an orientation and a motion of a physical object, in response to receiving the output data from the data processing system.

The apparatus of the further embodiment is interesting as an autonomously operating, i.e., unsupervised, small electronic device for, e.g., data collection, data transmission or data-controlled actuation on the basis of one or more physical quantities sensed. Examples of the physical quantity sensed are: motion, magnetic field, pressure, vibration, sound, temperature, humidity, acidity, amount of specific chemicals (e.g., carbon monoxide, oxygen, smoke) present in the environment of the apparatus, speed or mass flow per unit time of a flowing liquid or flowing gas, incident electromagnetic radiation such as light (visible, infrared or ultraviolet), proximity of a physical object, etc. The apparatus then functions as, e.g., an autonomous sensor, an autonomous actuator, an autonomous transmitter, or an autonomous data collector.

As specified above, the electronic circuitry is configured for determining the amount of energy available from the energy source. The process of determining the amount of energy available from the energy source is carried out by, e.g., a dedicated component of the electronic circuitry external to the signal processing system, or by the signal processing system itself.

For example, the electronic circuitry comprises a dedicated component between the energy source and the signal processing system. Consider the example, wherein a voltage at the energy source is representative of the amount of energy available from the energy source. The dedicated component comprises, e.g., a voltage sensor or a voltage range sensor. The dedicated component then supplies a control signal to the signal processing system that is indicative of the voltage sensed or of the voltage range sensed. The signal processing system uses this control signal to determine which of the pending signal processing tasks can be executed. For example, the signal processing system has available a look-up table that relates a specific one of the signal processing tasks to a specific amount of energy or power. The control signal enables the signal processing system to select via the look-up table, one or more suitable ones of the signal processing tasks that match the energy or power available. Alternatively, the signal processing system itself includes the above voltage sensor or the above voltage range sensor, or a functional equivalent thereof. In this case, however, the voltage sensor, the voltage range sensor or the functional equivalent is rendered operative only when the energy source is connected to the signal processing system. Whether the dedicated component or the functionality integrated with the signal processing system is preferred may depend on, e.g., the desirability of having a modular design of the apparatus or of the electronic circuitry versus the desirability of having an integrated design.

As specified earlier, the electronic circuitry comprises an energy control component for conditionally connecting the energy source and the signal processing system, depending on whether a first magnitude of the amount of energy, available from the energy source, is higher than a first pre-determined threshold or a second magnitude of the amount of energy, available from the energy source, is lower than a second pre-determined threshold. Note that the dedicated component was introduced above as an entity configured for determining the amount of energy available from the energy source in order to enable selection of one or more suitable ones of the signal processing tasks for execution. In an embodiment of the apparatus of the invention, the energy control component comprises the dedicated component. The operation of each is based on the sensing of voltage or of a voltage range. Both may therefore use the same voltage sensor or the same voltage range sensor.

As specified above, the electronic circuitry is configured for selecting for execution a specific one of the plurality of pre-determined signal processing tasks in dependence on the amount determined. The further process of selecting for execution a specific one of the plurality of pre-determined signal processing tasks in dependence on the amount determined, is carried out by, e.g., a further dedicated component of the electronic circuitry external to the signal processing system, or by the signal processing system itself. For example, the further dedicated component includes the dedicated component introduced above (for example, the voltage sensor or the voltage range sensor) and, in addition, a transcoder. The transcoder is configured to translate the voltage sensed, or the voltage range sensed, into a further control signal. The further control signal is indicative of one or more specific identifiers, each respective one whereof is associated with a respective one of the signal processing tasks. The one or more specific identifiers identify those specific ones among the signal processing tasks, whose energy consumption requirements match the energy or power available from the energy source as sensed by the voltage sensor or the voltage range sensor. The transcoder includes, e.g., a look-up table that relates a voltage sensed or a voltage range sensed, to one or more specific ones of the signal processing tasks. The further control signal is sent to the signal processing system, so as to enable the signal processing system to start the signal processing tasks indicated or, alternatively, to select from among the indicated signal processing tasks those ones that need to be executed or those ones that need to be executed and also comply with additional criterions, examples of which have been given earlier. Alternatively, the signal processing system itself includes the further dedicated component or an equivalent functionality. Again, whether the further dedicated component or its functionality integrated with the signal processing system is preferred may depend on, e.g., the desirability of having a modular design of the apparatus or of the electronic circuitry versus the desirability of having an integrated design.

Embodiments of the invention can be commercially exploited as an apparatus of the kind specified above. Other embodiments of the invention can be commercially exploited as electronic circuitry configured for use in the apparatus as specified above. For example, the electronic circuitry is a generic building block accommodating the signal processing system. The signal processing system is programmable, e.g., by the end-user, so as to be combinable with any specific data source, e.g., a specific sensor, and any specific data destination, e.g., a wireless transmitter, and/or so as to be combinable with an energy source of the kind, specified above, in order to create an apparatus according to the invention. As another example, the electronic circuitry accommodates the signal processing system and the data source and/or the data destination to form a dedicated or customized component for an apparatus according to the invention.

Embodiments of the invention can further be commercially exploited as a method of controlling execution of a plurality of pre-determined signal processing tasks. The method comprises determining an amount of energy available from an energy source. A magnitude of the amount of energy varies over a service life of the energy source. The method further comprises selecting for the execution a specific one of the pre-determined signal processing tasks in dependence on the magnitude determined.

BRIEF DESCRIPTION OF THE DRAWINGS

The invention is explained in further detail, by way of example and with reference to the accompanying drawings, wherein.

DETAILED EMBODIMENTS

Figure 1:
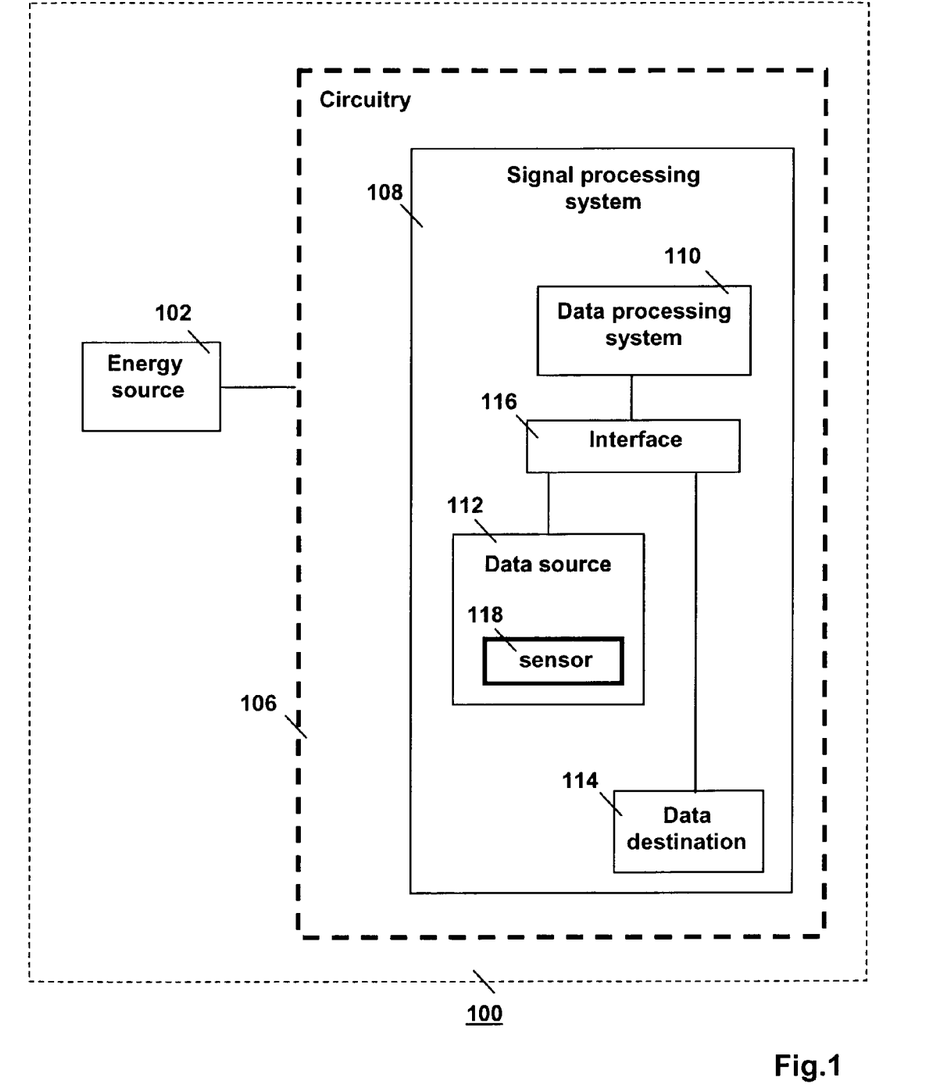
FIG. 1 is a block diagram of an apparatus of the invention.

FIG. 1 is a diagram of an apparatus 100 in the invention. The apparatus 100 comprises an energy source 102, and electronic circuitry 106 with a signal processing system 108. The signal processing system 108 is configured for executing a plurality of pre-determined signal processing tasks. The energy source 102 supplies power to the electronic circuitry 106. The energy source 102 is configured to make available to the electronic circuitry 106 an amount of energy that varies over a service life of the energy source 102. That is, at different times during the service life of the energy source 102, there are different amounts of energy or power available for supply to the electronic circuitry 106.

The signal processing system 108 comprises a data processing system 110, a data source 112, a data destination 114 and an interface 116. The interface 116 couples the data processing system 110 to the data source 112 and to the data destination 114 for data communication. The data source 112 is configured for supplying input data to the data processing system 110. The data destination 114 is configured for receiving output data from the data processing system 110. The data processing system 110 is configured for processing the input data under instruction control and supplying the output data resulting from the data processing.

The data processing system 110 processes the input data, received from the data source 112, under control of instructions representative of the relevant pre-determined signal processing task selected for being executed by the signal processing system 108. For example, a first one of the pre-determined signal processing tasks comprises retrieving the input data from the data source 112 via the interface 116. A second one of the pre-determined signal processing tasks comprises carrying out one or more data processing operations on the retrieved input data at the data processing system 110. A third one of the pre-determined signal processing tasks includes supplying, via the interface 116, the results of the second pre-determined signal processing task as output data to the data destination 114.

In an embodiment of the apparatus 100, the data source 112 comprises one or more sensors 118 for capturing information about one or more physical quantities (such as temperature, humidity, mechanical vibrations, mechanical stress or strain, etc.) that are characteristic of the environment of the apparatus 100. In order to not obscure the drawing, only a single sensor 118 is indicated. The sensor 118 supplies sensor data, representative of the information captured, to the data processing system 110 via the interface 116. The data processing system 110 processes the sensor data and supplies the result of the processing to the data destination 114 via the interface 116. The data destination 114 comprises, e.g., a memory (not shown) for accumulating the processing results over time until an external agent reads the memory for collecting the processing results at a convenient moment. As another example, the data destination 114 comprises a transmitter (not shown) for transmitting the results of the processing, e.g., via wired transmission or wireless transmission, to a receiver (not shown) external to the apparatus 100. As still another example, the data destination 114 comprises an actuator (not shown) for controlling a position, orientation or motion of a physical object (not shown) in response to receiving the results from processing the sensor data obtained from the sensor 118. The physical object comprises, for example, a valve in a system for transporting a fluid. The position of the valve is made to depend on, e.g., the ambient temperature. As another example, the physical object comprises a shield to be raised or lowered in dependence on a radiation level (e.g., sunlight) sensed. As another example, the physical object comprises a mirror in a portable heating device based on capturing solar power. The position of the mirror is fixed relative to the earth, and the actuator controls the mirror's orientation so as to follow the path of the sun.

The apparatus 100 has its own power supply in the form of the energy source 102, and functions autonomously so long as enough energy is available from the energy source 102 to maintain the electronic circuitry 106 operational.

The execution and completion of a specific one of the pre-determined signal processing tasks by the signal processing system 108 needs a specific amount of energy. The electronic circuitry 106 has available information, determined in advance, about the individual amount of energy or power, needed for execution and completion of an individual one of the plurality of pre-determined signal processing tasks.

For clarity, the amount of energy or power associated with a particular pre-determined signal processing task involves at least one of: a first amount of energy or power, consumed by the data processing system 110 when processing the input data under instruction control; a second amount of energy or power, consumed by the data source 112 when generating and supplying input data to the data processing system 110; a third amount of energy or power, consumed by the data destination 114 when receiving the processing results from the data processing system 110 and acting in response thereto. The selected one of the pre-determined signal processing tasks determines which data processing instructions are to be executed by the data processing system 110. The data processing instructions control, e.g., the retrieval by the processing system 110 of the input data from the data source 112, the processing of the input data by the data processing system 110, or the supply of the output data by the data processing system 110 to the data destination 114.

For example, if the data source 112 comprises a sensor, such as sensor 118 as mentioned above, the second amount of energy includes the energy consumed by the sensor 118 when generating a sensor signal and supplying the sensor signal as input data to the data processing system 110. As another example, if the data destination 114 comprises a wireless transmitter (not shown), as mentioned above, the third amount of energy includes the energy needed for transmitting. As another example, if the data destination 114 comprises an actuator (not shown), as mentioned above, the third amount of energy includes the energy consumed by the actuator while doing mechanical work in controlling a position orientation or motion of a physical object. As yet another example, if the data destination 114 comprises a non-volatile memory (not shown), as mentioned above, the third amount of energy includes the energy consumed by the non-volatile memory when the output data from the data processing system 110 is written to the non-volatile memory.

The electronic circuitry 106 is configured for determining an amount of energy or power currently available from the energy source 102 for power supply to the signal processing system 108. This determining can be implemented in a variety of manners. For example, the electronic circuitry 106 itself includes a measuring device (not shown) configured for measuring a physical quantity (e.g., a voltage, an amount of electric charge), exhibited by the energy source 102 and representative of the amount of energy currently available from the energy source 102 for powering the signal processing system 108. Alternatively, the energy source 102 itself accommodates another measuring device (not shown) that measures the physical quantity exhibited by the energy source 102 and transmits to the electronic circuitry 106 information that is indicative of the amount of energy available from the energy source 102. Alternatively, an energy control component (not shown) coupled between the energy source 102 and the electronic circuitry 106 automatically connects the energy source 102 to the electronic circuitry if the amount of energy, available from the energy source, is larger than a pre-determined threshold. The electronic circuitry 106 is then activated when the amount of energy available from the energy source 102 is larger than the pre-determined threshold. The precise amount of available energy may thereupon be determined by a measuring device (not shown) included in the electronic circuitry 106, e.g., in the signal processing system 108.

It is now assumed that the information about the amount of available energy has been made available to the electronic circuitry 106. The electronic circuitry 106, e.g., the signal processing system 108 or another dedicated component (not shown) of the electronic circuitry 106, generates control data, representative of the amount of energy or power available and supplies this control data to the data processing system 110. The data processing system 110 uses this control data for selecting a specific one of the pre-determined signal processing tasks in dependence on the amount determined. The selected signal processing task is then executed. Alternatively, the electronic circuitry 106, e.g., the signal processing system 108 or a further dedicated component (not shown) of the electronic circuitry 106, receives the information about the amount of energy available and translates this information into further control data that itself is representative of one or more specific ones of the signal processing tasks that can be executed in view of the amount of energy available from the energy source 102. The selecting of the specific signal processing task has then been delegated to parts of the electronic circuitry 106, other than the data processing system 110.

Figure 2:
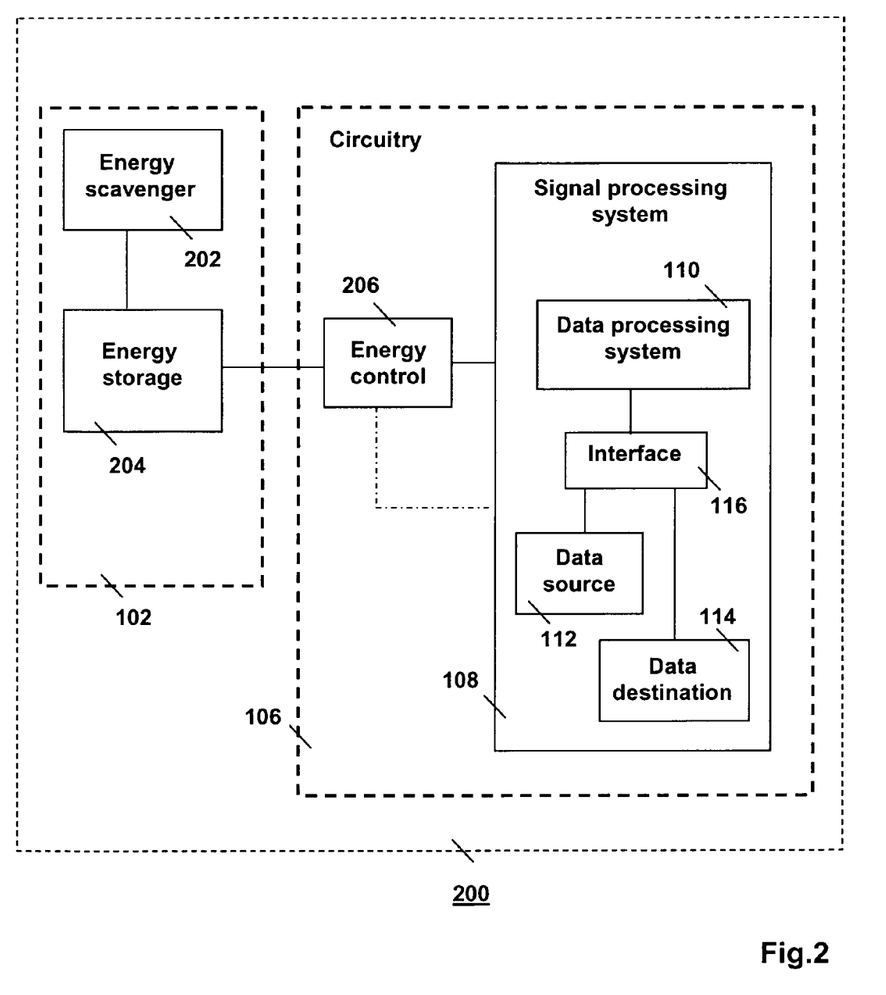
FIGS. 2 and 3 are embodiments of the apparatus of FIG. 1.

FIG. 2 is a diagram of a first embodiment 200 of the apparatus 100 discussed above with reference to FIG. 1. In the first embodiment 200, the energy source 102 comprises an energy scavenger 202 for scavenging ambient energy, and an energy storage device 204 configured for storing the ambient energy scavenged by the energy scavenger 202. The energy harvested is eventually used to power the electronic circuitry 106. Whether or not the energy scavenger 202 is capable of harvesting energy during a certain time interval, and if so, how much, depends on external, inherently unpredictable circumstances. As a result, it is not known in advance whether, at a certain moment, enough energy or power will be available from the energy storage device 204 for powering the electronic circuitry 106, and for thereby enabling the signal processing system 108 to execute one or more specific ones of the pre-determined signal processing tasks. Therefore, first the amount of energy, available from the energy storage device 204, is determined, and then it is determined if the amount available is adequate for executing one or more specific signal processing tasks.

The electronic circuitry 204 also comprises an energy control component 206, functionally located between the energy source 102 and the signal processing system 108, and operative to control the power supply to the signal processing system 108.

For example, the energy control component 206 is operative to turn the power to the signal processing system 108 on or off, under control of the amount of energy that is available from the energy storage device 204. If the amount of energy exceeds a first pre-determined threshold, the energy switch turns the power supply to the signal processing system 108 on. If the amount of energy drops below a second pre-determined threshold, lower than the first pre-determined threshold, the energy switch turns the power supply to the signal processing system 108 off. The first pre-determined threshold is chosen so that a corresponding first amount of energy, available from the energy storage 204, is at least sufficient for the signal processing system 108 to determine whether it has started from a zero-power state or from a sleep mode. The second pre-determined threshold is chosen so that the difference between the first amount of energy at the first pre-determined threshold and a second amount of energy at the second pre-determined threshold is at least enough for the data processing system 110 to perform housekeeping tasks in preparation to its being turned off.

After the energy control component 206 has turned the power supply to the signal processing system 108 on, the signal processing system 108 determines, in a low-power mode, the amount of energy available from the energy storage device 204 so as to be able to select a specific one of the pre-determined signal processing tasks for execution. Alternatively, the energy control component 206 is configured to send to the signal processing system 108 a control signal that is representative of one or more specific ones of the pre-determined signal processing tasks that can be executed in view of the amount of energy available from the energy storage.

How to determine the amount of energy available from the energy storage device 204 is illustrated in more detail with reference to the following examples.

Consider an embodiment of the apparatus 100, wherein the energy storage device 204 comprises a capacitor (not shown). As known, the amount of electric charge "Q" stored at a capacitor depends on the product of the voltage "V" across the capacitor, on the one hand, and the capacitance "C" of the capacitor on the other hand. The capacitance C is a given quantity for a particular capacitor. The capacitance C is determined by the physical properties of the materials (conductors and dielectrics), from which the capacitor is made, and by the spatial dimensions of the capacitor, such as: the surface areas of the conductors facing each other and the distance between the conductors storing charges of opposite polarity. The energy stored in a capacitor depends on the product of the voltage V and the capacitance C. Accordingly, the energy control component 206 can be configured to measure the voltage across the capacitor as a representative of the energy available from the capacitor.

Consider another embodiment of the apparatus 100, wherein the energy storage device 204 comprises a battery that can be recharged (not shown). As known, the internal Ohmic resistance of a battery increases under discharge, and the open circuit voltage of the battery decreases under discharge. For a particular type of battery, the relationship between the discharge state and the open circuit voltage is known, as well as the relationship between the discharge state and the Ohmic resistance. Accordingly, if the type of battery of the energy storage device 204 is known, the energy control component 206 can measure the Ohmic resistance and/or the open circuit voltage in order to determine the discharge state, from which the remaining amount of energy available can be determined, e.g., via a look-up table. Possibly, the degradation of the battery's performance during its service life can be taken into account, based on test-results obtained in advance and programmed in the look-up table.

An example of a circuit suitable for implementing the energy control component 206 is disclosed in, e.g., US patent application publication 2008/0047363, referred to above.

As another example, assume that the energy storage device 204 functions as a voltage source. The energy control component 206 may then comprise a DC/DC converter (not shown) that is operative to supply to the signal processing system 108 a voltage of a fixed magnitude, if the energy storage device 204 has an amount of energy available, larger than a pre-determined threshold. For example, the energy storage device 204 has a power capacity of 1 mWh in delivering 1 mAh at 1V. This is assumed to be adequate for executing one or more specific ones of the pre-determined signal processing tasks. However, in order to function in a stable, predictable manner, the signal processing system 108 requires a supply voltage of 5V. The DC/DC converter generates the 5V supply voltage from the 1V voltage at the energy storage 204. As an option, the energy required to execute the selected signal processing task includes the energy losses involved in the DC/DC converter, and/or in the energy control component 206 as a whole.

The DC/DC converter sees to it that the signal processing system 108 receives a stable supply voltage when being powered. However, a stable constant supply voltage is not always required. It may be less expensive to implement the energy control component 206 without a DC/DC converter if the energy storage device 204 is capable of delivering the energy at a suitable voltage. During execution of a predetermined signal processing task, energy is consumed and the voltage at the energy storage device 204 drops. If the drop in voltage is small enough, this drop may not be an issue for the signal processing system 108 in the sense that the voltage drop affects the integrity of the signal processing itself.

As mentioned above, a pre-determined signal processing task is selected for execution, depending on the amount of energy available from the energy storage device 204. Assume that a reserve amount of energy ΔE is needed for the signal processing system 108 to perform the housekeeping tasks before shutting down. As a result, the amount of energy available from the energy storage device 204 has to be higher than the reserve amount of energy ΔE, in order to be able to perform a pre-determined signal processing task.

Consider an example implementation wherein the apparatus 100 is configured for performing three pre-determined signal processing tasks. A first pre-determined signal processing task involves acquisition of the input data from the data source 112. The input data comprises, say, one hundred samples. A second pre-determined signal processing task involves processing the samples by the data processing system 110, including applying multiple filters. The data processing of the samples results in the output data supplied by the data processing system 110. A third pre-determined signal processing task involves the transmission of the output data via the data destination 114, which includes a wireless transmitter.

The first pre-determined signal processing task needs a fixed amount of energy. The input data needs to be retrieved and buffered. A first amount of energy E1, required for executing the first pre-determined signal processing task, is constant, and can be determined in advance. Accordingly, in order for the signal processing system 108 to execute the first pre-determined signal processing task, an amount of energy E1 (tot) is required equal to the sum of the first amount E1 and the reserve amount ΔE.

The second pre-determined signal processing task needs an amount of energy E2, also fixed. The second pre-determined signal processing task can be subdivided in a sequence of smaller pre-determined signal processing sub-tasks, one for each filter to be applied. Each respective pre-determined signal processing sub-task, indicated with an index "i", requires a respective amount of energy E2(i). The second pre-determined signal processing task is executed in one go, and therefore the amount of energy E2 required equals the sum of the amounts of energy E2(i), summed over the index "i" plus the reserve amount ΔE.

Now consider the scenario, wherein fewer than all sub-tasks of the second pre-determined signal processing task are being executed between powering up the signal processing system 108 via the energy control component 206 and an unhoped-for shutting down of the signal processing system 108 via the energy control component 206. Now, the second pre-determined signal processing task is not completed and also the housekeeping tasks cannot be completed. The intermediate results produced during the second pre-determined signal processing task will be lost. When, later on, the energy control component 206 connects the energy storage 204 to the signal processing system 108, the second pre-determined signal processing task is to be restarted from the beginning.

Whether or not the third pre-determined signal processing task can be executed depends on whether or not the transmitter in the data destination 114 is allowed to transmit, e.g., in view of interference with another wireless transmitter or with a nearby wireless receiver. Whether or not the third pre-determined signal processing task can be completed, once execution has started, may also depend on the apparatus 100 receiving an acknowledgment from the receiver that has received the output data transmitted by the transmitter in the data destination 114. In short, there is a conditional aspect involved here. Further, the energy required for executing the third pre-determined signal processing task depends on the transmission power of the transmitter.

Accordingly, the signal processing system 108 can temporarily assume a sleep mode while waiting for a time slot, wherein the transmission can start. A maximum waiting time is allotted, which corresponds to the consumption of an amount of energy E3(wait free). If a time slot has not been made available before the waiting time expires, the signal processing system 108 registers a first failure.

The wireless transmission requires an amount of energy E3(trans). Optionally, after the transmission has completed, the signal processing system 108 remains active and waits for the acknowledgment. A maximum wait time can be set which corresponds to the consumption of an amount of energy E3(wait ackn). If an acknowledgement has not been received, or if a negative acknowledgement is received, the signal processing system 110 registers a second failure.

The first and/or second registered failures can then be used to indicate to the signal processing system 108 to restart the third pre-determined signal processing task if, and when, enough energy is available from the energy storage device 204. Upon registering the first failure or the second failure, the signal processing system 108 may actively control the energy control component 206 to turn off the power to the electronic circuitry 106.

With regard to the example implementation discussed above with the three pre-determined signal processing tasks, note that the length of time, which elapses between the acquisition of the input data and the transmission of the output data, cannot be determined in advance as a result of the unpredictability of the amount of energy available at the energy storage device 204 and replenished by the energy scavenger 202. It may therefore be advisable to time stamp the input data. However, this is not so easy in practice. Turning off the power supply to the electronic circuitry 106 also stops any internal clock of the electronic circuitry 106.

One solution to this problem is to derive the time stamps from an external clock, e.g., a radio source. This then requires that the signal processing system 108 be equipped with a dedicated component to receive the radio signal from the external clock and that one of the multiple pre-determined signal processing tasks involves receiving the radio signal from the external clock and deriving time stamps. However, it may be that the signal processing system 108 fails to receive the radio signal within an acceptable time period wherein the signal processing system 108 is active. For example, reception of the radio signal from the external clock is temporarily blocked by moving objects external to the embodiment 200 or the integrity of the radio signal is affected by interference from other radio sources.

Another solution to the problem of how to be able to time-stamp the input data (or the output data) is using an electronic calendar clock (not shown) that is local to the electronic circuitry 106. The local calendar clock is equipped with a power supply (e.g., a further battery) that is independent of the energy source 102. Power consumption of an electronic calendar clock is generally low enough for the further battery in order to power the electronic calendar clock for a time that is long compared to the expected or intended duration of the service life of the apparatus 100. In principle, the electronic calendar clock can be configured so as to have the further battery recharged from the energy source 102 to extend the service life of the electronic calendar clock almost indefinitely. In embodiments of the apparatus 100, the electronic calendar clock is integrated on the same semiconductor substrate as, e.g., the data processing system 110, or the signal processing system 108 as a whole.

Figure 3:
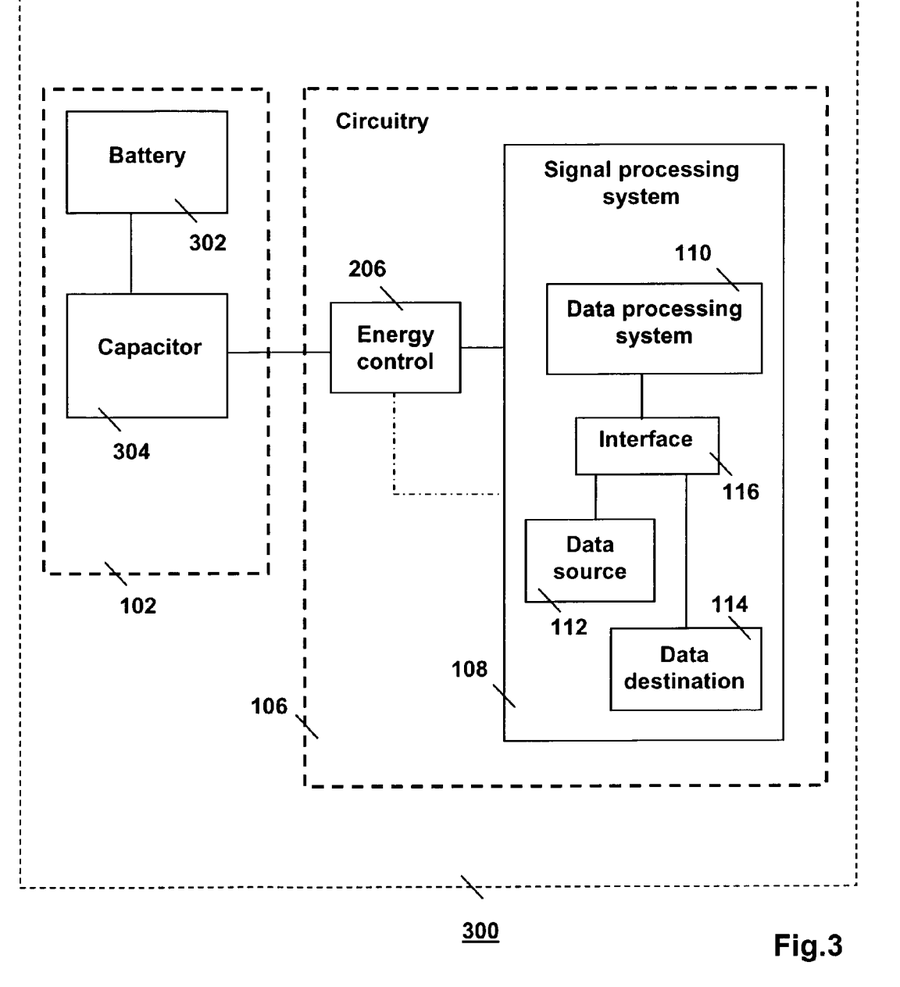

FIG. 3 is a diagram of a second embodiment 300 of the apparatus 100 discussed above with reference to FIG. 1. In the second embodiment 300, the energy source 102 comprises a battery 302 and a capacitor 304, electrically arranged in parallel with the battery 302. The battery 302 comprises, e.g., a disposable battery. As known, the performance of a disposable battery gradually deteriorates over time as a result of chemical and physical changes that take place in the battery's components during use. Although the storage properties and discharge properties of a disposable battery can be selected in advance to be appropriate for the battery's intended application, the battery does not always provide the expected amount of current or power before becoming depleted. This makes it difficult to ensure a reliable operation of a disposable battery as part of the energy source 102. The battery 302 is electrically arranged in parallel with the capacitor 304. When a disposable battery discharges, its internal Ohmic resistance increases. As a result, the amount of energy, which can be supplied per unit of time (i.e., the power) to the electronic circuitry 106, decreases. The capacitor 304 now serves as an impedance transformer and provides a lower internal impedance than the battery 304, thus increasing the amount of energy per unit of time that can be supplied to the electronic circuitry 106. When the capacitor 304 discharges as a result of supplying a current to the electronic circuitry 106, the battery 302 recharges the capacitor 304. It may take some time for the battery 302 to recharge the capacitor 403, depending on the discharge state of the battery 302. However, once the capacitor 304 has been recharged, more power (energy per unit of time) is available again from the capacitor 304 than would be available directly from the battery 302 itself, i.e., available from the battery 302 in the absence of the capacitor 304. Note that the energy source 102 may comprise the energy scavenger 202 and an energy storage device 204 that includes the battery 302 as well as the capacitor 304. The battery 302 then serves to store the energy harvested by the energy scavenger 202, whereas the capacitor 304 is arranged to serve as a power supply with low impedance.

In FIGS. 1, 2 and 3, the data source 112, the data destination 114 and the interface 116 are drawn as parts of the signal processing system 108. If the data source 112, the data destination 114 and the interface 116 form parts of the signal processing system 108, the energy supplied by the energy source 102 for powering the signal processing system 108 is used to power the data processing system 110, the interface 116, the data source 112 and the data destination 114. Accordingly, the selection procedure for selecting a specific one of the plurality of the pre-determined signal processing tasks in dependence on the amount of energy available from the energy source 102, takes into account the amounts of energy consumed by the components of the signal processing system 108 involved in executing the selected pre-determined signal processing task. In another embodiment (not shown) of the apparatus 100, the selection procedure for selecting the pre-determined signal processing task in dependence on the energy available from the energy source 102, does not take into account the amount of energy to be consumed by the data source 112, the data destination 114 and the interface 116. The energy consumption of a particular one of the data source 112, the data destination 114 and the interface 116 need not be considered, for example, if the particular one of the data source 112, the data destination 114 and the interface 116 has its own individual power supply or if the energy consumed in operational use is negligible with respect to that of one or more other components in the signal processing system 108.

The execution of a pre-determined signal processing task requires a certain amount of energy or power, including, e.g., saving state information to non-volatile memory before the signal processing system being shut down by cutting off the power. When configuring the apparatus 100, one could replace a single, larger pre-determined signal processing task by multiple smaller pre-determined signal processing tasks, each therefore requiring a smaller amount of energy for its execution and the associated housekeeping than does the larger pre-determined signal processing task. This approach allows for a finer granularity in the selection procedure regarding the specific pre-determined signal processing task to be executed. Also, smaller amounts of energy may be available from the energy source 102 more frequently than larger amounts of energy. A large set of smaller pre-determined signal processing tasks may therefore be more desirable than a small set of larger pre-determined signal processing tasks. For example, the energy source 102 of the first embodiment 200 comprises the energy scavenger 202. The probability of there being available, at any given moment, a small amount of energy, is higher than the probability that a large amount of energy is available at that moment. As a result, a small signal processing task, whose completion requires a small amount of energy, has a higher chance of getting executed than a large signal processing task that requires a large amount of energy in order to be completed. If the signal processing is based on a larger set of smaller signal processing tasks, the apparatus 100 will be active during a larger portion of the service life of the apparatus 100 than in case the same signal processing is based on a smaller set of larger signal processing tasks.

On the other hand, a consequence of the finer granularity (having a larger number of smaller signal processing tasks) is that, overall, there may be more energy consumed by the housekeeping tasks than in the scenario of a coarser granularity (having a smaller number of larger signal processing tasks). For example, in case of finer granularity, state saving and writing data to non-volatile memory will be more frequent. This may be a drawback in the embodiment 300 using the battery 302 in the energy source 102, notably in extremely low power and/or long service life applications of the apparatus 100. The desired level of granularity is then chosen by the designer of the apparatus 100 based on, e.g., the expected frequency of having to perform housekeeping tasks in operational use of the apparatus 100, the amount of energy required by each housekeeping task, the expected variation in the amounts of energy available, etc.

Figure 4:
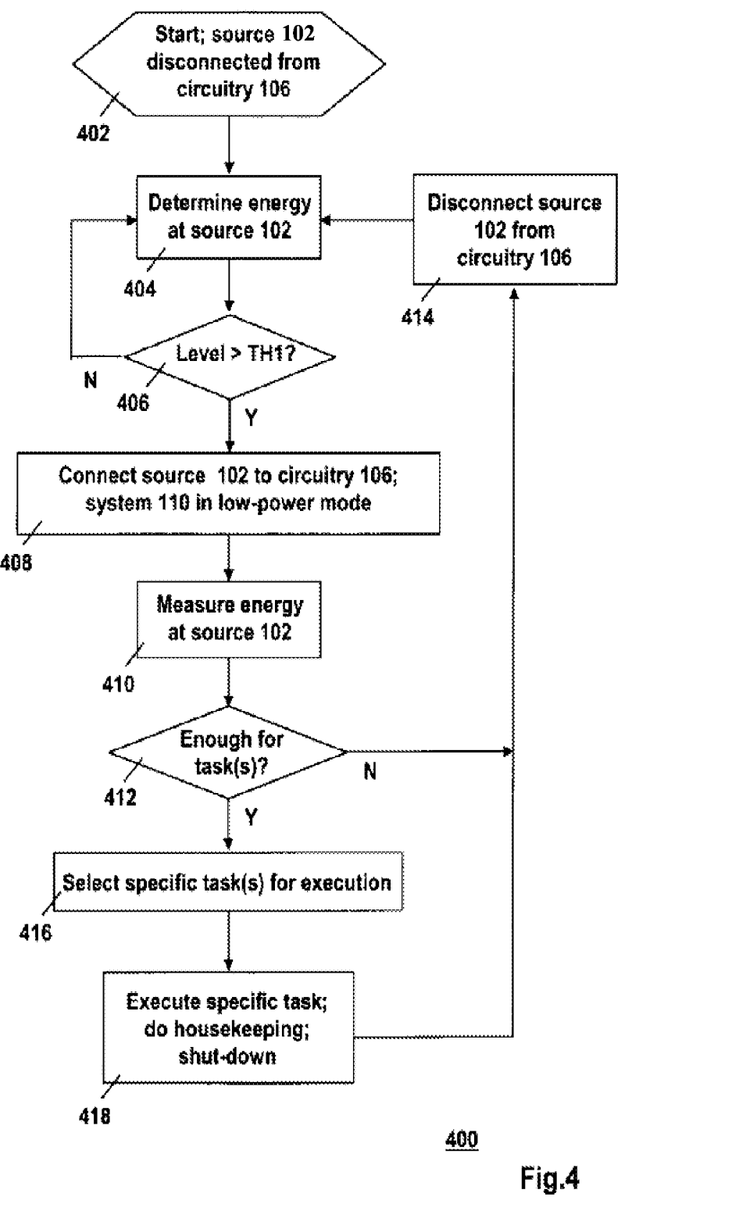
FIG. 4 is a flow diagram illustrating aspects of a process in the invention. Throughout the drawings, similar or corresponding features are indicated by same reference numerals.

FIG. 4 is a flow diagram, illustrating aspects of an example process 400 according to the invention.

In a first step 402, the apparatus 100 is installed for operational use. The energy source 102 is functionally disconnected from the electronic circuitry 106.

In a second step 404, the amount of the energy is determined that is available from the energy source 102.

In a third step 406, it is determined if the available amount of the energy, determined in the second step 404, is larger than a pre-determined threshold TH. If the available amount of energy is not larger than the pre-determined threshold TH, the process 400 returns to the second step 404. If the available amount of energy is larger than the pre-determined threshold TH, the process 400 proceeds with a fourth step 408.

In the fourth step 408, the energy source 102 is connected to the electronic circuitry 106 so that the electronic circuitry 106 receives power. The signal processing system 108 and the data processing system 110 come alive and the data processing system 110 enters a low-power operating mode.

In a fifth step 410, the amount of energy available from the energy source 102 is determined.

In a sixth step 412, it is determined whether or not there is enough energy available from the energy source 102 for executing one or more pending ones of the pre-determined signal processing tasks. If there is not enough energy available from the energy source 102, the process 400 proceeds with a seventh step 414.

In a seventh step 414, the energy source 102 is disconnected from the electronic circuitry 106, and the process 400 returns to the second step 404.

If, in the sixth step 412, it is determined that there is enough energy available from the energy source 102 for executing one or more pending ones of the pre-determined signal processing tasks, the process 400 proceeds with an eighth step 416.

In an eighth step 416, one or more specific ones of the pending signal processing tasks are selected for execution. For example, a list of the plurality of pre-determined signal processing tasks is consulted. The list associates, with each respective one of the predetermined signal processing tasks, a respective selection criteria regarding a respective amount of energy consumed when executing the respective pre-determined signal processing task, including housekeeping. Optionally, one or more respective additional selection criterions are associated with the respective one of the pre-determined signal processing tasks. Examples of additional selection criterions and the selection process have been given above. In the eighth step 416, one or more specific ones of the pre-determined signal processing tasks are selected for being executed, based on the amount of energy measured in the fifth step 410, based on the particular amount of energy needed for executing the selected pre-determined signal processing task and, optionally, based on additional selection criterions. Note that two or more particular ones of the pre-determined signal processing tasks may be selected for execution, one after another, if the amount of energy measured in the fifth step 410 is larger than needed for executing a single pending one of the pre-determined signal processing tasks according to the list. If the available amount of energy, measured in the fifth step 410 allows the execution of a first group of pre-determined signal processing tasks OR the execution of a second group of pre-determined signal processing steps, the first group and the second group not being identical, an optimization procedure may be run, e.g., by the data processing system 110, so as to be able to determine which one of the first and second group to select for execution. This optimization process is known in mathematics as the "knapsack problem" and is a well known resource allocation problem. Alternatively, the programmer or designer of the apparatus 100 has prepared in advance a look-up table with an inventory of solutions for this selection problem for all possible energy levels measured in the fifth step 410. Then, this look-up table is consulted, e.g., by the data processing system 110 in the eighth step 418, in order to unambiguously determine the relevant group of pre-determined signal processing tasks to be executed.

In a ninth step 418, the one or more selected ones of the signal processing tasks are executed. Upon completion of the execution of the one or more selected signal processing tasks, the data processing system 110 carries out the housekeeping tasks in preparation to shutting down. The housekeeping tasks may include, e.g., saving state information or saving intermediate data processing results in a non-volatile memory. Housekeeping tasks are conventionally performed before shutting down or entering a sleep mode. After the housekeeping tasks have been carried out, the data processing system 110 shuts down. The process 400 returns then to the seventh step 414, wherein the energy source 102 is disconnected from the electronic circuitry 106.

For clarity: the expression "signal processing task" as used herein refers to any task involving the signal processing system 106. Examples of a signal processing task have been discussed above and include, e.g., the transmission of a data packet via a wireless link (e.g., an RF link), the control of an actuator to adjust a valve, charging the further battery of the calendar clock, etc.

A number of aspects/embodiments of the invention have been described. It is to be understood that each aspect/embodiment may be combined with any other aspect/embodiment. The invention may thus be varied within the scope of the accompanying patent claims.

The invention claimed is:

1. An apparatus comprising:
   electronic circuitry with a signal processing system for executing a plurality of pre-determined signal processing tasks; and
   an energy source configured for powering the electronic circuitry in operational use of the apparatus, wherein the energy source is operative to supply an amount of energy that varies over a service life of the energy source;
   wherein the electronic circuitry is configured for:
      measuring the amount of energy currently available from the energy source;
      connecting the energy source and the signal processing system if the amount of energy that is currently available from the energy source is greater than a first predetermined amount;
      selecting for execution a specific one of the plurality of pre-determined signal processing tasks based on the amount of energy that is currently available from the energy source being greater than a second predetermined amount; and
      disconnecting the energy source from the signal processing system if the amount of energy that is currently available from the energy source is less than a third predetermined amount; wherein the first predetermined amount is greater than the third predetermined amount, and the third predetermined amount is an amount of energy large enough to run housekeeping tasks in preparation to being turned off.

2. The apparatus of claim 1, wherein the energy source comprises:
   an energy scavenger for scavenging ambient energy; and
   an energy storage configured for storing the ambient energy scavenged by the energy scavenger.

3. The apparatus of claim 1, wherein the energy source comprises a battery.

4. The apparatus of claim 3, wherein the energy source comprises a capacitor electrically arranged in parallel with the battery.

5. The apparatus of claim 1, wherein:
   the signal processing system comprises a data processing system for processing input data and supplying output data under instruction control;
   the apparatus comprises a data source for supplying the input data to the data processing system, and a data destination for receiving the output data from the data processing system;

the data source comprises a sensor for sensing a physical quantity, indicative of an environment of the apparatus;

the sensor is operative to generate the input data, representative of the physical quantity sensed; and the data destination comprises at least one of:

a memory for accumulating the output data;

a transmitter for transmitting the output data to a receiver external to the apparatus; and an actuator for controlling at least one of a position, an orientation and a motion of a physical object, in response to receiving the output data.

6. The apparatus of claim 1, wherein the energy source and the signal processing system are functionally disconnected from one another if the amount of energy that is currently available from the energy source is less than the third predetermined amount.

7. The apparatus of claim 1, wherein the energy source and the signal processing system are physically disconnected from one another if the amount of energy that is currently available from the energy source is less than the third predetermined amount.

8. A method of controlling execution of a plurality of predetermined signal processing tasks, wherein the method comprises:

measuring, using electronic circuitry, an amount of energy currently available from an energy source, the energy source being operative to supply the amount of energy with a magnitude that varies over a service life of the energy source;

connecting the energy source with a signal processing system if the amount of energy that is currently available from the energy source is greater than a first predetermined amount;

selecting for the execution a specific one of the pre-determined signal processing tasks based on the amount of energy that is currently available from the energy source being greater than a second predetermined amount; and disconnecting the energy source from the signal processing system if the amount of energy that is currently available from the energy source is less than a third predetermined amount; wherein the first predetermined amount is greater than the third predetermined amount, and the third predetermined amount is an amount of energy large enough to run housekeeping tasks in preparation to being turned off.

9. An apparatus comprising:

electronic circuitry with a signal processing system for executing a plurality of pre-determined signal processing tasks; and an energy source configured to power the electronic circuitry, wherein the energy source supplies an amount of energy that increases and decreases over a service life of the energy source;

wherein the electronic circuitry is configured to:

determine the amount of energy currently available from the energy source at a first time;

cause the energy source to be connected to the electronic circuitry when the electronic circuitry determines that the amount of energy currently available at the first time is greater than a first predetermined amount, wherein the energy source is initially disconnected from the electronic circuitry;

determine the amount of energy currently available from the energy source at a second time; and select a specific one of the plurality of pre-determined signal processing tasks to be executed when the amount of energy that is determined to be currently available at the second time is greater than a second predetermined amount, wherein the second predetermined amount is greater than the first predetermined amount; and disconnecting the energy source from the signal processing system if the amount of energy that is currently available from the energy source is less than a third predetermined amount; wherein the first predetermined amount is greater than the third predetermined amount, and the third predetermined amount is an amount of energy large enough to run housekeeping tasks in preparation to being turned off.

10. The apparatus of claim 9, wherein the electronic circuitry performs one or more housekeeping operations upon completion of the specific one of the plurality of pre-determined signal processing tasks being executed, wherein the housekeeping operations are selected from the group consisting of saving state information and saving intermediate data processing results.

11. The apparatus of claim 10, wherein the electronic circuitry is further configured to cause the energy source to be disconnected from the electronic circuitry after the one or more housekeeping operations are complete.

12. The apparatus of claim 9, wherein the energy source and the electronic circuitry are functionally disconnected from one another if the amount of energy that is currently available from the energy source is less than the third predetermined amount.

13. The apparatus of claim 9, wherein the energy source and the electronic circuitry are physically disconnected from one another if the amount of energy that is currently available from the energy source is less than the third predetermined amount.

* * * * *